United States Patent [19]

Hara

[11] Patent Number: 4,673,530

[45] Date of Patent: Jun. 16, 1987

[54] PROCESS FOR THE PRODUCTION OF A NATURAL ANTIOXIDANT OBTAINED FROM TEA LEAVES

[75] Inventor: Yukihiko Hara, Shizuoka, Japan

[73] Assignee: Mitsui Norin Co., Ltd., Tokyo, Japan

[21] Appl. No.: 613,093

[22] Filed: May 22, 1984

[30] Foreign Application Priority Data

May 30, 1983 [JP] Japan .................... 58-94069

[51] Int. Cl.$^4$ .................... C07D 311/04; C09K 15/34; C09K 15/08
[52] U.S. Cl. .................... 252/398; 252/404; 549/399
[58] Field of Search .................... 252/398, 404; 560/68, 560/69; 549/399

[56] References Cited

U.S. PATENT DOCUMENTS

| | | | |
|---|---|---|---|
| 2,098,254 | 8/1936 | Mattill et al. | 252/398 |
| 2,548,588 | 4/1951 | Carrara | 560/69 |
| 3,950,266 | 4/1976 | Chang et al. | 252/398 |
| 4,105,784 | 8/1978 | Okada | 549/399 |
| 4,248,789 | 2/1981 | Okada | 260/345.2 |
| 4,352,746 | 10/1982 | Bracco et al. | 252/398 |
| 4,363,823 | 12/1982 | Kimura et al. | 252/398 |
| 4,515,804 | 5/1985 | Marti et al. | 549/399 |
| 4,613,672 | 9/1986 | Hara | 549/399 |

FOREIGN PATENT DOCUMENTS

| | | | |
|---|---|---|---|
| 506600 | 10/1954 | Canada | 252/404 |
| 0015417 | 2/1978 | Japan | 549/399 |

OTHER PUBLICATIONS

Harborne et al, The Flavonoids, Academic Press, (1975), pp. 550-553.
Kajimoto, Nippon Shokuhin Kogyo Gakkaishi, 10, 1, 3, (1963), pp. 365-368.
Chipault et al, The Antioxidant Properties of Natural Spices, Food Research, vol. 17, (1952), pp. 46-55.
Chem. Abstracts, 80:119307x, (1974).
Chem. Abstracts, 76:70341(e), (1972).
Chem. Abstracts, 96:6481M, (1982).
Chem. Abstracts, 77:58728Z, (1975).
Chem. Abstracts, 69:77066h, (1968).
Sanderson, The Chemistry of Tea and Tea Manufacturing, Recent Advances in Phytochemistry, No. 5, pp. 247-255, (1972).
Hudson, Naturally-Occurring Antioxidants in Leaf Lipids, J. Sci. Food Agric., 1980, 31, 646-650.
The Merck Index-Tenth Edition, p. 8932.
Haslem, Vegetable Tannins, Recent Advances in Phytochemistry, vol. 12, Biochemistry of Plant Phenolics, pp. 475-499.
Tanizawa et al, Natural Antioxidants I. Antioxidative Components of Tea Leaf (Thea sinensis L.), Chem. Pharm. Bull., 32(5)2011-2014, (1984).
Matsuzaki et al, Antioxidative Activity of Tea Leaf Catechins, Nippon Nogeikugaku Kaisha, vol. 59, No. 2, pp. 129-134, 1985.
Chipault, J. R., "Antioxidants for Use in Foods", In: Lundberg, W. D., Autoxidation and Antioxidants, vol. II, (New York, J. Wiley and Sons, 1962), pp. 511-512.

Primary Examiner—John F. Terapane
Assistant Examiner—Virginia B. Caress
Attorney, Agent, or Firm—Frishauf, Holtz, Goodman & Woodward

[57] ABSTRACT

A process for producing a natural antioxidant from tea leaves comprising treating said tea leaves with a solvent selected from the group consisting of hot water (preferably 80° C.-100° C.), a 40-75% aqueous solution of methanol, a 40-75% aqueous solution of ethanol and a 30-80% aqueous solution of acetone to obtain an extract-containing solution; washing the extract-containing solution with chloroform to obtain a washed extract; combining the washed extract with an organic solvent to transfer said washed extract into said organic solvent; removing the organic solvent; and drying the resulting extract. The invention also provides the natural antioxidant produced by the aforesaid process.

18 Claims, 3 Drawing Figures

PROCESS FOR THE PRODUCTION OF A NATURAL ANTIOXIDANT OBTAINED FROM TEA LEAVES

BACKGROUND OF THE INVENTION

Tea is known to have some pharmaceutical effects. With remarkable advances in methods of isolating the active components of tea, the relationship between these active components and pharmaceutical effects has been clarified in recent years. For example, caffeine activates the central nervous system and tea tannin has anti-inflammatory properties. In addition, tea contains various vitamins, such as vitamin C, and soluble inorganic salts, such as potassium, which serve to inhibit acidosis. On the other hand, tea tannin which is predominantly composed of catechins belongs to polyphenol compounds that is known to have an antioxidant property as represented by butylated hydroxy anisole (BHA). Therefore, tea tannin is expected to be an antioxidant, but no industrial extraction of it is yet reported.

In the course of the inventor's continuing studies of the physiological activity of tea, it has been found that a tea extract contains a strong antioxidant fraction. The present invention is based on the foregoing findings and provides a process for producing a natural antioxidant containing the antioxidant fraction of tea leaves in high yield.

SUMMARY OF THE INVENTION

The present invention is directed to a process for producing a natural antioxidant from tea leaves which comprises the steps of:
- treating tea leaves with hot water or a solvent selected from a 40–75% aqueous solution of methanol, a 40–75% aqueous solution of ethanol and a 30–80% aqueous solution of acetone to obtain an extract-containing solution;
- washing the extract-containing solution with chloroform;
- combining the washed extract with an organic solvent to thereby transfer said washed extract into said organic solvent
- removing the organic solvent; and
- drying the extract.

DETAILED DESCRIPTION OF THE INVENTION

Figure 1:
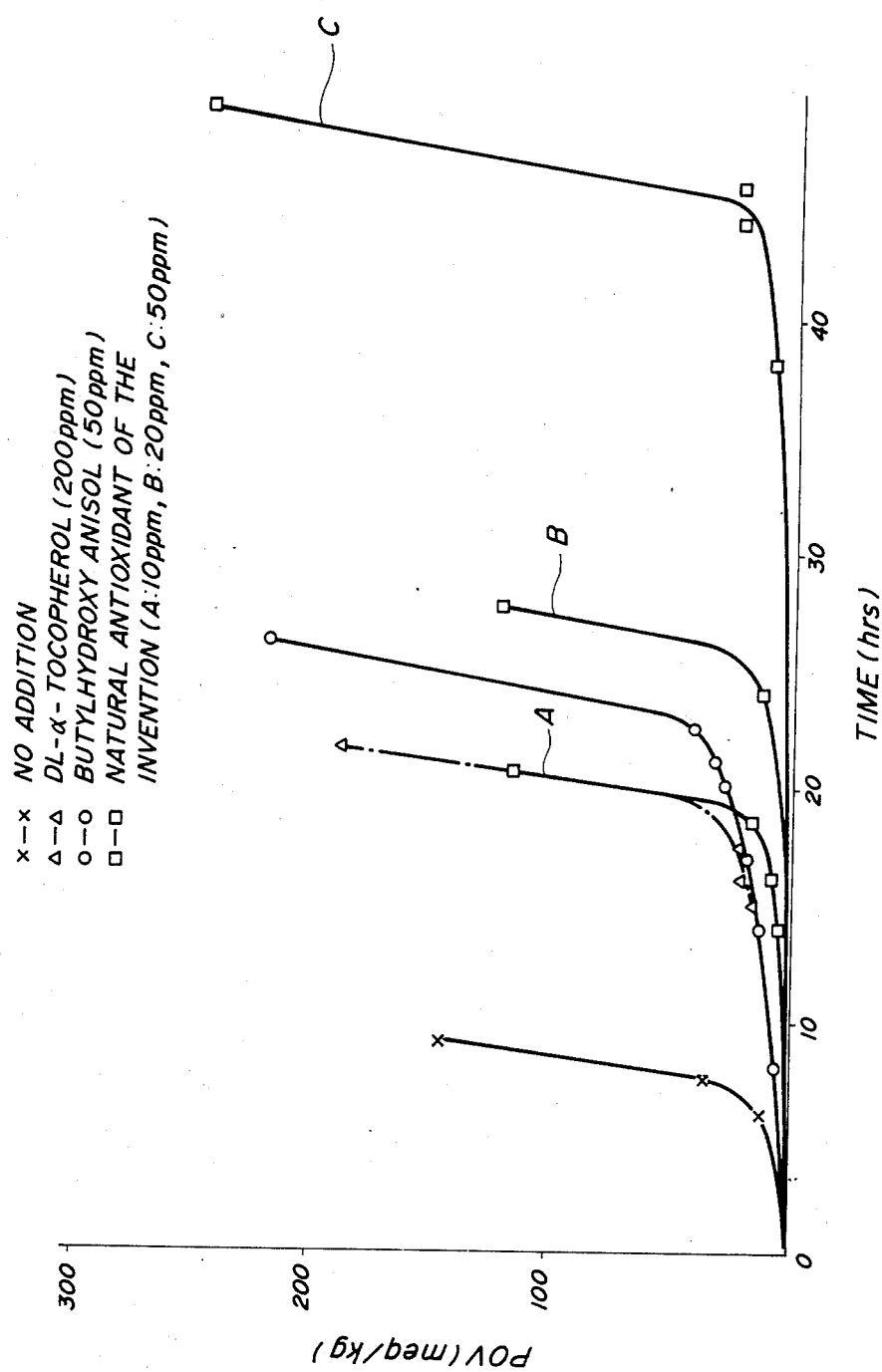
FIG. 1 is a graph showing antioxidant test results of various types of antioxidants on lard.

Various types of tea leaves (except fermented tea) can be used as a source of the antioxidant in the present invention, i.e. unfermented tea and half-fermented tea. Examples of the unfermented tea are fresh tea leaves, green tea, instant green tea, etc., and examples of the half-fermented tea is Oolong tea. The tea leaves are first treated with hot water or with an aqueous solution of methanol, ethanol or acetone in the specified concentrations. If the tea leaves are treated with hot water, the temperature of the water is at least 40° C., preferably from 80° C. to 100° C.

A 40–75% aqueous methanol solution, a 40–75% aqueous methanol solution, a 40–75% aqueous ethanol solution, and a 30–80% aqueous acetone solution can also be used to treat the tea leaves. The concentration of methanol, ethanol and acetone should be controlled within the ranges defined above. Outside the ranges, the efficiency of the process undesirably decreases. Similarly, if other solvents are used, the same good results as in the present invention cannot be obtained.

The first step of the process is performed under such conditions that tea tannin, an effective ingredient of the natural antioxidant, can be extracted in sufficient amounts. Accordingly, treatment of the tea leaves is usually performed for at least 5 minutes and preferably for 10 minutes to 24 hours. If necessary, auxiliary techniques such as agitation can be employed to shorten the time for extracting the tea tannin in the form of an extract-containing solution.

The extract-containing solution is then washed with chloroform. The volume of chloroform used is preferably approximately equal to that of the extract-containing solution. Washing with chloroform removes caffeine, chlorophyll, etc., from the solution. If necessary the washed solution can be further treated with a small amount of activated carbon to remove pigments remaining in the solution.

The washed extract is then transferred to an organic solvent by a conventional procedure. For this purpose, various organic solvents can be used. Suitable examples of such solvents are ethyl acetate, n-butanol, methyl isobutyl ketone, and acetone. Particularly preferred are ethyl acetate and acetone with salting out. The organic solvent is then removed by distillation under reduced pressure.

Thereafter, the residual component is dried, whereupon the desired natural antioxidant is obtained. The drying process can be performed in various ways. A suitable drying process should be chosen taking into account, for example, the purpose for which the natural antioxidant of the present invention is used. Usually freeze drying or spray drying is employed under known conditions. The natural antioxidant can be made in the form of powder, flakes, etc.

The natural antioxidant of the present invention contains the so-called tea tannin. The tannin content is usually at least about 30% (as determined by the standard tea component-analyzing process) although it varies with, for example, the extraction conditions. Typically, the tannin content is about 70%. In Example 1 as described hereinafter, the tannin content of the natural antioxidant is 72%. If has further been found that the tannin component of the extract is composed primarily of (−) epigallocatechin gallate and additionally contains small amounts of (−) epigallocatechin, (−) epicatechin gallate, (−) epicatechin, etc.

The natural antioxidant produced by the present invention is readily soluble in water, and can also be dissolved easily in oils and fats by previously dissolving the antioxidant in a small amount of ethanol. Thus the natural antioxidant of the present invention can be used in both water-soluble and oil-soluble foodstuffs. In addition to such foodstuffs, the natural antioxidant of the present invention can be used in cosmetics, petroleum products, and so forth.

Furthermore, the natural antioxidant of the present invention exhibits excellent antioxidant properties. The same antioxidant effect as obtained with dl-α-tocopherol, which is a common antioxidant, can be obtained by using the natural antioxidant of the present invention in an amount of only about 1/10 to 1/20 (as determined by AOM method) of the amount of dl-α-tocopherol.

The present invention is described in greater detail with reference to the following examples.

EXAMPLE 1

One hundred grams of instant green tea were added to and completely dissolved in 1,000 milliliters of hot water. Then equal volumes of the tea solution and chloroform were mixed and the tea solution was washed with the chloroform to remove caffeine, pigments, and so forth, to thereby obtain 1,100 milliliters of an impurity-free solution containing the washed extract. This solution was treated three times with the same volume of ethyl acetate to transfer into the solvent the washed extracted component. The ethyl acetate layers were combined together and concentrated under reduced pressure. After the addition of a small amount of water, the ethyl acetate was distilled away to obtain a concentrated aqueous solution. This concentrated aqueous solution was freeze-dried by a conventional procedure to obtain 26.9 grams of solids. The tannin content of the solids was 72% by weight. From 12 grams of the antioxidant powder, 4.87 grams of (−) epigallocatechin gallate, 1.44 grams of (−) epigallocatechin, 1.24 grams of (−) epicatechin gallate and 0.85 grams of (−) epicatechin were obtained. This means that 70% of the powder is composed of the above four inredients.

The thus-prepared natural antioxidant was tested for its antioxidant effect on lard (not containing any other antioxidant) by the AOM method. The results are shown in FIG. 1 along with those obtained using dl-α-tocopherol and butylhydroxy anisol (BHA) which are commercially available antioxidants. As is apparent from FIG. 1, 10 to 20 parts per million (ppm) of the natural antioxidant of the present invention exhibits an antioxidant effect corresponding to 200 ppm of dl-α-tocopherol and 50 ppm of BHA.

Figure 2:
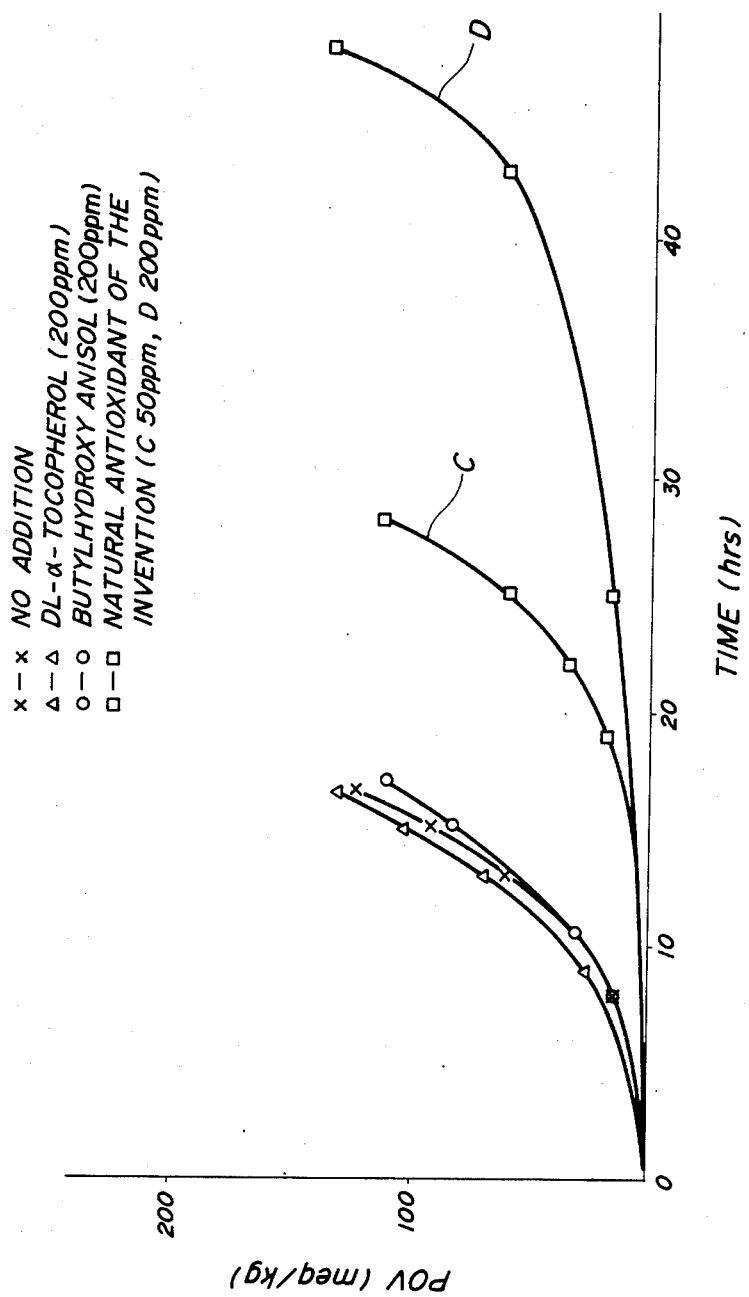
FIG. 2 is a graph showing antioxidant test results of various types of antioxidants on salad oil.

The natural antioxidant of the present invention was also tested for its antioxidant effect on consumer salad oil by the AOM method. The results are shown in FIG. 2 along with those obtained using dl-α-tocopherol and BHA. As is apparent from FIG. 2, dl-α-tocopherol and BHA do not have an antioxidant effect on consumer salad oil. On the other hand, the natural antioxidant of the present invention shows a remarkable antioxidant effect when added in an amount of 50 ppm.

EXAMPLE 2

One hundred grams of green tea were extracted with 1,000 milliliters of a 50% aqueous ethanol solution for 10 minutes while stirring. The tea leaves were removed by filtration to obtain about 1,000 milliliters of a filtrate. Equal volumes of the filtrate and chloroform were mixed, and the mixture was stirred to transfer caffeine, pigments, etc. into the chloroform/ethanol layer, whereupon about 800 milliliters of a water/ethanol layer was obtained. This water/ethanol layer was treated three times with the same volume of ethyl acetate. Ethyl acetate layers were combined together and concentrated under reduced pressure. After the addition of a small amount of water, the ethyl acetate was distilled away to obtain a concentrated aqueous solution. This concentrated aqueous solution was freeze-dried to obtain 11.9 grams of solids. The tannin content of the solids was 72% by weight.

EXAMPLE 3

Two hundred grams of fresh tea leaves, the enzymes of which had been inactivated by steaming were placed in a mixer along with a 70% aqueous methanol solution, stirred and ground for 10 minutes, and then subjected to centrifugation to obtain 770 milliliters of a supernatant liquid. Equal volumes of the supernatant liquid and chloroform were mixed, and the liquid was washed with the chloroform to transfer caffeine, pigments, etc. into a chloroform/methanol layer, whereupon 690 milliliters of a water/methanol layer were obtained. This water/methanol layer was treated three times with the same volume of ethyl acetate. The ethyl acetate layers were combined and concentrated under reduced pressure. After the addition of a small amount of water, the ethyl acetate was distilled away to obtain a concentrated aqueous solution. This concentrated aqueous solution was then freeze-dried by a conventional procedure to obtain 7.6 grams of solids. The tannin content of the solids was 51% by weight.

EXAMPLE 4

One hundred grams of instant green tea were extracted with 1,000 milliliters of a 60% aqueous methanol solution for 10 minutes while stirring. The insoluble material was removed by centrifugation to obtain 920 milliliters of a supernatant liquid. Equal volumes of the supernatant liquid and chloroform were mixed, and the supernatant liquid was washed with the chloroform to transfer caffeine, pigments, etc. into the chloroform layer, whereupon 820 milliliters of a water/methanol layer were obtained. This water/methanol layer was then treated three times with the same volume of ethyl acetate. The ethyl acetate layers were combined and concentrated under reduced pressure. After the addition of a small amount of water, the ethyl acetate was distilled away to form a concentrated aqueous solution. This concentrated aqueous solution was freeze-dried to obtain 43.0 grams of solids. The tennin content of the solids was 58% by weight.

EXAMPLE 5

One hundred grams of instant green tea were extracted with 1,000 milliliters of a 60% aqueous acetone solution for 10 minutes while stirring. The insoluble material was removed by centrifugation to obtain 950 milliliters of a supernatant liquid. Equal volumes of the supernatant liquid and chloroform were mixed, and the supernatant liquid was washed with the chloroform to transfer caffeine, pigments, etc. into a chloroform/acetone layer, whereupon 500 milliliters of a water/acetone layer were obtained. This water/acetone layer was treated three times with the same volume of ethyl acetate. The ethyl acetate layers were combined and concentrated under reduced pressure. A small amount of water was added to the concentrated material, and the ethyl acetate was distilled away to obtain a concentrated aqueous solution. This concentrated aqueous solution was freeze-dried to obtain 30.6 grams of solids. The tannin concentration of the solids was 76.0% by weight.

EXAMPLES 6-9

Extracts were prepared in the following manner using the solvents shown in Table 1. Fifteen grams of instant green tea were dissolved in 100 milliliters of hot water. Equal volumes of the aqueous solution and chloroform were mixed, and the aqueous solution was washed with the chloroform. Thereafter the extracted component (effective ingredients) was transferred into 470 milliliters of the organic solvent shown in Table 1. The organic solvent was distilled away, and the resulting dry material was analyzed. The results are shown in Table 1:

TABLE 1

|  | Solvent | | | |
|---|---|---|---|---|
|  | Ethyl acetate | n-Butanol | Methyl isobutyl ketone | Acetone |
| Amount of Solids (grams) | 3.92 | 6.13 | 4.57 | 7.03 |
| Solids Extraction Ratio (%) | 26.1 | 40.9 | 30.5 | 46.9 |
| Amount of Tannin (grams) | 2.72 | 3.51 | 3.02 | 3.65 |
| Tannin Content of Solids (%) | 69.4 | 57.3 | 66.1 | 51.9 |
| Remarks | Easy to handle. | Extract is in the form of colloid. | Concentration needs a long time. | Easy to handle. |

EXAMPLE 10

In this example, the amount of the extracted tannin obtained for each solvent having the concentration specified in Tables 2 and 3 was examined.

Ten grams of green tea or instant green tea were extracted with 100 milliliters of the specified extraction solvent for 1 hour. The amount of tannin extracted was measured and compared with the amount of tannin obtained by the standard tea-analyzing method. The amount of tannin obtained from the standard tea-analyzing method was given the value of 100. In the standard tea-analyzing method, 100 milligrams of tea leaves are boiled in 100 milliliters of hot water for 30 minutes.

TABLE 2

| (Green Tea) | | | | | | | |
|---|---|---|---|---|---|---|---|
|  | Concentration (%) | | | | | | |
|  | 30 | 40 | 50 | 60 | 70 | 75 | 80 |
| Methanol | 51 | 63 | 71 | 80 | 79 | 79 | 79 |
| Ethanol | 49 | 76 | 77 | 80 | 82 | 74 | 68 |
| Acetone | 54 | 60 | 64 | 65 | 63 | 60 | 55 |
| Hot Water | 83 | | | | | | |

TABLE 3

| (Instant Green Tea) | | | | | | | |
|---|---|---|---|---|---|---|---|
|  | Concentration (%) | | | | | | |
|  | 30 | 40 | 50 | 60 | 70 | 75 | 80 |
| Methanol | * | 83 | 89 | 94 | 81 | 65 | ** |
| Ethanol | * | 90 | 95 | 89 | 88 | 64 | ** |
| Acetone | 99 | 100 | 100 | 96 | 93 | 90 | 87 |
| Hot Water | 100 | | | | | | |

*Forms an emulsion.
**Forms a uniform layer with chloroform.

Treatment of instant green tea with aqueous solutions of the various solvents produces an advantage that insoluble polymeric materials can be removed in advance. When acetone is used, if the concentration is less than 30%, the insoluble material is difficult to separate. If the concentration is in excess of 80%, the water content is too small, which is not suitable for practical use and, furthermore, increases the loss of the solvent.

Reference Example (−) Epigallocatechin gallate (EGCg), (−) epigallocatechin (EGC), (−) epicatechin gallate (ECg), and (−) epicatechin (EC), which are components of tea tannin, were each tested for their antioxidant effect on lard in the same manner as in Example 1. The results are shown in FIG. 3.

Figure 3:
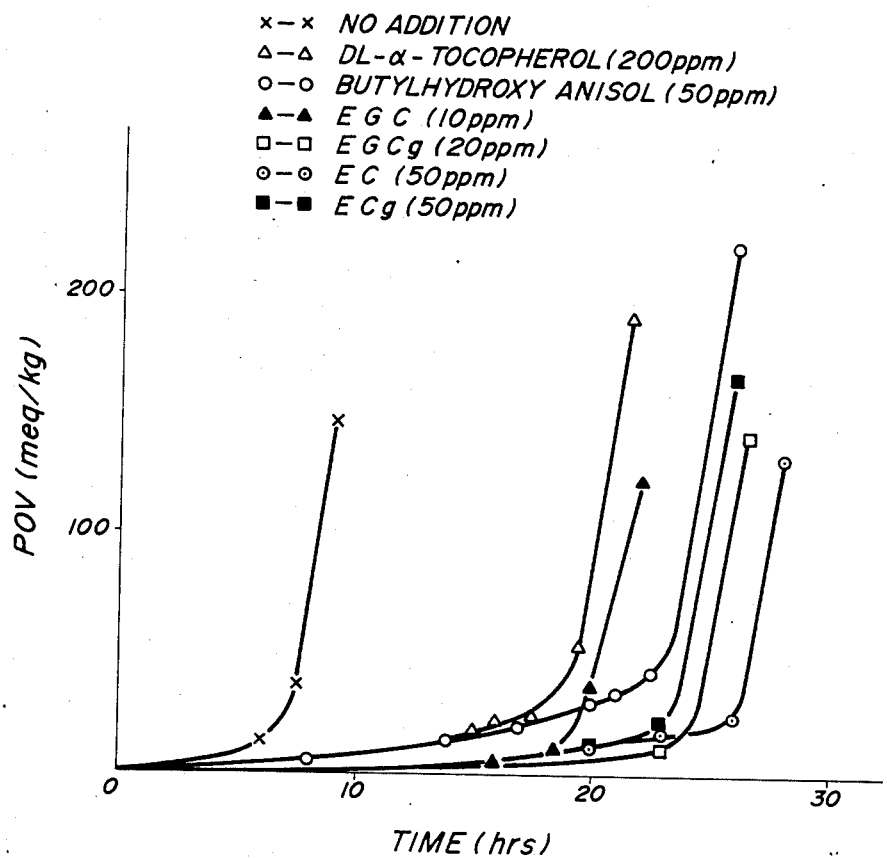
FIG. 3 is a graph showing antioxidant test results of tea tannin components on lard.

As apparent from FIG. 3, each component has antioxidant properties.

What is claimed is:

1. A process for producing a natural antioxidant composed primarily of (−)-epigallocatechin gallate, (−)-epicatechin gallate, (−)-epigallocatechin and (−)-epicatechin from tea leaves selected from the group consisting of unfermented tea and half-fermented tea comprising:

treating said tea leaves with a solvent selected from the group consisting of hot water having a temperature of at least 40° C., a 40–75% aqueous solution of methanol, a 40–75% aqueous solution of ethanol and a 30–80% aqueous solution of acetone to obtain an extract-containing solution;

washing the extract-containing solution with chloroform to obtain a washed extract;

combining the washed extract with an organic solvent to transfer said washed extract into said organic solvent;

removing the organic solvent to provide an extract; and drying said extract which is said natural antioxidant comprising said mixture of gallate compounds.

2. The process of claim 1, wherein the organic solvent is selected from the group consisting of ethyl acetate, n-butanol, methyl isobutyl ketone, and acetone.

3. The process of claim 2 wherein said organic solvent is ethyl acetate.

4. The process of claim 2 wherein said organic solvent is acetone.

5. The process of claim 1 wherein the step of removing the organic solvent comprises distilling away the organic solvent.

6. The process of claim 1 wherein the step of drying the resulting extract comprises freeze-drying or spray drying the resulting extract.

7. The process of claim 1 wherein the hot water has a temperature of between 80° C. and 100° C.

8. The process of claim 1 wherein the step of treating the tea leaves is conducted for at least five minutes.

9. The process of claim 8 wherein the step of treating the tea leaves is conducted for between 10 minutes and 24 hours.

10. The process of claim 1 wherein the tea leaves are selected from the group consisting of fresh tea leaves, green tea and instant green tea.

11. The process of claim 10 wherein the tea leaves are instant green tea.

12. The process of claim 1 further comprising treating the washed extract with activated carbon.

13. The process of claim 1 wherein the chloroform is used in an amount approximately equal to the amount of the extract-containing solution.

14. A process for producing a natural antioxidant from tea leaves comprising:

treating tea leaves selected from the group consisting of unfermented tea and half-fermented tea for at least five minutes with a solvent selected from the group consisting of water having a temperature of at least 80° C., a 40–75% aqueous solution of methanol, a 40–75% aqueous solution of ethanol and a 30–80% aqueous solution of acetone to thereby obtain an extract-containing solution;

washing the extract-containing solution with an amount of chloroform approximately equal to the amount of the extract-containing solution to thereby obtain a washed extract;

combining the washed extract with an organic solvent selected from the group consisting of ethyl acetate, n-butanol, methyl isobutyl ketone and acetone to thereby transfer said washed extract into said organic solvent;

distilling away the organic solvent; and drying the resulting extract.

15. The process of claim 14 wherein said organic solvent is ethyl acetate or acetone.

16. The process of claim 15 wherein the step of treating the tea leaves is conducted for between 10 minutes and 24 hours.

17. The process of claim 14 wherein the tea leaves are fresh tea leaves or green tea or instant green tea.

18. The process of claim 14 further comprising treating the washed extract with activated carbon.

* * * * *